United States Patent Office 2,799,679
Patented July 16, 1957

2,799,679

PROCESS OF PREPARING AMIDES OF HETERO-
CYCLIC CARBOXYLIC ACIDS

Bo Thuresson af Ekenstam, Bofors, and Börje Per Harald
Egnér, Karlskoga, Sweden, assignors to Aktiebolaget
Bofors, Bofors, Sweden, a corporation of Sweden No Drawing. Application July 28, 1955,
Serial No. 525,058

Claims priority, application Sweden April 28, 1955

6 Claims. (Cl. 260—294)

This invention relates to the amides of hetercyclic carboxylic acids. More particularly, it is directed to novel methods for the manufacture thereof.

The amides of this invention are typified by the general formula

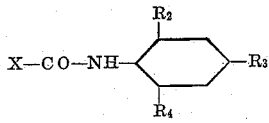

wherein X is a member of the group consisting of N-alkyl piperidyl, N-alkyl 2-pyrrolidyl, piperidyl, 2-pyrrolidyl, or pyridyl radicals and wherein $R_2$ is a member of the group consisting of hydrogen, a lower alkyl radical and a chlorine atom, $R_3$ is a member of the group consisting of hydrogen, a lower alkyl radical and an alkoxy radical and $R_4$ is a member of the group consisting of hydrogen, a chlorine atom, a lower alkyl radical, and an alkoxy radical. $R_2$ can be a hydrogen atom only at the same time as $R_3$ and $R_4$ are also hydrogen atoms.

The N-alkyl anilides having the above general formula are described in our pending application for Letters Patent, Serial Number 510,862, filed May 24, 1955.

The N-alkyl anilides have excellent local anaesthetic property, coupled with low toxicity in relation to their efficiency.

It has been found that the aforesaid anilides can be manufactured from an aryl magesium halide (prepared by reacting aniline or a nuclear substituted aniline with an alkyl magnesium halide) with an ester of N-alkyl piperidine or N-alkyl-α-pyrrolidine carboxylic acid or piperidine or 2-pyrrolidine carboxylic acids or pyridine carboxylic acids.

The primary reaction products resulting from the interaction of the aryl magnesium halide, and the ester of aforesaid carboxylic acid is then hydrolyzed with an acid to produce the amide. Where the anilide is one in which the heterocyclic moiety is unsaturated, that moiety of the anilide may be catalytically hydrogenated to produce the amide of the corresponding piperidine or pyrrolidine carboxylic acid. These amides in turn may then be N-alkylated with alkylating agents.

The following are illustrative examples of this invention:

*Example 1*

Ethyl magnesium bromide is prepared in the usual way by reacting 185 parts by weight of ethyl bromide in 800 parts of anhydrous ether with 37 parts by weight of magnesium turnings. Under vigorous stirring 121 parts of 2,6-dimethyl aniline are added at a rate depending on the vigour of the gas evolution. When the evolution of gas has ceased, 85 parts by weight of N-methyl pipecolic acid ethyl ester are added to the 2,6-dimethyl aniline magnesium bromide slurry. The mixture is refluxed for ½ hr. with continued stirring, after which it is cooled down. Dilute hydrochloric acid is added carefully in order to dissolve and hydrolyse the magnesium compound formed. The pH is adjusted to 5.5, and the water phase separated and extracted with additional ether in order to remove the surplus dimethyl aniline. After addition of an excess of ammonia to the solution, the reaction product, N-methyl pipecolic acid 2,6-dimethyl anilide, is recovered by extraction with isoamyl alcohol. The isoamyl alcohol solution is evaporated to dryness, the product dissolved in dilute hydrochloric acid, treated with charcoal and reprecipitated with NaOH. N-methyl pipecolic acid 2,6-dimethyl anilide is obtained in crystalline form.

*Example 2*

In a corresponding way to that described in Example 1, 2-ethyl aniline magnesium bromide is prepared from 121 parts by weight of 2-ethyl aniline and reacted with 78 parts of nipecotic acid ethyl ester. In accordance with the same procedure as in Example 1, nipecotic acid 2-ethyl anilide is obtained. 10 parts by weight of this anilide are dissolved in 16 parts of isopropyl alcohol and 5.3 parts of isopropyl bromide and 5 parts of potassium carbonate are added. The mixture is refluxed for 12 hrs. with stirring, filtered and evaporated to dryness. After dissolution of the residue in dilute hydrochloric acid and reprecipitation with alkali, the free base of N-isopropyl nipecotic acid 2-ethyl anilide is obtained.

*Example 3*

In a corresponding way to that described in Example 1, aniline magnesium bromide is prepared from 93 parts of aniline, and reacted with 75 parts of isonicotinic acid ethyl ester. The magnesium compound formed, is dissolved and hydrolysed in dilute hydrochloric acid, after which the pH is adjusted to about 7, and the ether separated. The remaining water solution is twice extracted with isoamyl alcohol, which together with the ether solution is evaporated to dryness. The evaporation residue is submitted to a steam distillation until freed from all aniline. The remaining isonicotinic acid anilide is dissolved in dilute hydrochloric acid, treated with charcoal, reprecipitated with alkali, filtered off and dried. 99 parts by weight of the isonicotinic acid anilide are dissolved in 240 parts of alcohol and 60 parts of glacial acetic acid. 2.5 parts of platinum oxide are added to the solution and the anilide is hydrogenated under a pressure of 2–5 atmospheres, and at a temperature of 50–80° C. When hydrogen is no longer absorbed, the catalyst is filtered off. 40 parts of NaOH (dissolved in water as a 40–50% solution) and 250 parts of ether are added to the filtrate. After cooling, the precipitated sodium acetate is filtered off and the filtrate is evaporated to crystallisation or down to dryness. 10 parts by weight of the evaporation residue (or the crystalline product) are dissolved in 16 parts by weight of methanol. 5 parts by weight of potassium carbonate and 5.2 parts by weight of dimethyl sulphate are added to the solution. After refluxing for 6 hours with stirring, the solution is filtered and evaporated to dryness. The residue is dissolved in dilute hydrochloric acid, treated with charcoal and reprecipitated with alkali. In this way, crystalline N-methyl isonipecotic acid anilide is obtained.

*Example 4*

In a corresponding way to that described in Example 1, 2-chloro-6-methyl aniline magnesium bromide is prepared from 141.5 parts by weight of 2-chloro-6-methyl aniline. This is then reacted with 100 parts by weight of N-n-butyl pyrrolidine-2-carboxylic acid ester. In accordance with the same procedure as that described in Example 1, N-n-butyl pyrrolidine-2-carboxylic acid 2-chloro-6-methyl anilide is obtained.

In accordance with the method of this invention, the following anilides may be manufactured from the designated initial starting materials to form anilides of the corresponding heterocyclic carboxylic acids.

1. Pipecolic acid 2,6-dimethyl anilide by using 2,6-dimethyl aniline magnesium bromide and pipecolic acid methyl ester as the initial starting materials.
2. Nicotinic acid 2-Cl-6-methyl anilide by using 2-Cl-6-methyl aniline magnesium bromide and nicotinic acid ethyl ester as the initial starting materials.
3. Isonicotinic acid 2-ethyl anilide by using 2-ethyl aniline magnesium bromide and isonicotinic acid ethyl ester as the initial starting materials.
4. Pyrrolidine-2 carboxylic acid 2,6-dimethyl anilide by using 2,6-dimethyl aniline magnesium bromide and pyrrolidine-2 carboxylic acid ethyl ester as the initial starting materials.
5. N-ethyl pyrrolidine-2 carboxylic acid 2,6-dimethyl anilide by using 2,6-dimethyl aniline magnesium bromide and N-ethyl pyrrolidine-2 carboxylic acid methyl ester as the initial starting materials.
6. N-n-propyl pyrrolidine-2 carboxylic acid 2-ethyl anilide by using 2-ethyl aniline magnesium bromide and N-n-propyl pyrrolidine-2 carboxylic acid ethyl ester as the initial starting materials.
7. N-methyl pipecolic acid 2,6-dimethyl-4-butoxy anilide by using 2,6-dimethyl-4-butoxy aniline magnesium bromide and N-methyl pipecolic acid ethyl ester as the initial starting materials.
8. N-methyl pipecolic acid 2,4-dimethyl-6-butoxy anilide by using 2,4-dimethyl-6-butoxy aniline magnesium bromide and N-methyl pipecolic acid ethyl ester as the initial starting materials.
9. N-methyl pipecolic acid 2-methyl-4-butoxy anilide by using 2-methyl-4-butoxy aniline magnesium bromide and N-methyl pipecolic acid ethyl ester as the initial starting materials.
10. N-ethyl pipecolic acid 2-methyl anilide by using 2-methyl aniline magnesium bromide and N-ethyl pipecolic acid ethyl ester as the initial starting materials.
11. N-ethyl pipecolic acid 2,4,6-trimethyl anilide by using 2,4,6-trimethyl aniline magnesium bromide and N-ethyl pipecolic acid ethyl ester as the initial starting materials.
12. N-methyl nipecotic acid 2,6-dimethyl-4-ethoxy anilide by using 2,6-dimethyl-4-ethoxy aniline magnesium bromide and N-methyl nipecotic acid methyl ester as the initial starting materials.
13. N-methyl nipecotic acid 2,4-dimethyl-6-ethoxy anilide by using 2,4-dimethyl-6-ethoxy aniline magnesium bromide and N-methyl nipecotic acid methyl ester as the initial starting materials.
14. N-n-butyl isonipecotic acid 2-ethyl anilide by using 2-ethyl aniline magnesium bromide and N-n-butyl isonipecotic acid ethyl ester as the initial starting materials.

It will be understood that the foregoing description of the invention and the examples set forth are merely illustrative of the principles thereof. Accordingly, the appended claims are to be construed as defining the invention within the full spirit and scope thereof.

We claim:
1. Method of manufacturing amides having the general formula

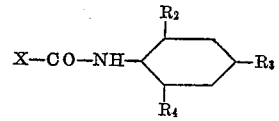

where X is a member of the group consisting of N-alkyl piperidyl, N-alkyl 2-pyrrolidyl, piperidyl, 2-pyrrolidyl, and pyridyl, and wherein $R_2$ is a member of the group consisting of hydrogen, a lower alkyl radical and a chlorine atom, $R_3$ is a member of the group consisting of hydrogen, a lower alkyl radical and an alkoxy radical and $R_4$ is a member of the group consisting of hydrogen, a chlorine atom, a lower alkyl radical, and an alkoxy radical which comprises reacting an aryl magnesium halogenide, having the formula

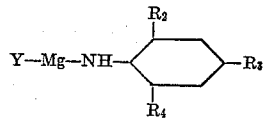

wherein Y is a halogen atom and wherein $R_2$, $R_3$ and $R_4$ have the significance above defined with an ester of a member of the group consisting of N-alkyl piperidyl carboxylic acids, N-alkyl α-pyrrolidine carboxylic acids, piperidyl carboxylic acids, α-pyrrolidine carboxylic acids, and pyridine carboxylic acids, then hydrolyzing the thus-produced reaction product to obtain the corresponding anilide.

2. Method of manufacturing N-methyl pipecolic acid 2,6-dimethyl anilide which comprises reacting N-methyl pipecolic acid ethyl ester with 2,6-dimethyl aniline-N-magnesium bromide, and then reacting the thus-produced reaction product with an acid to obtain the N-methyl pipecolic acid 2,6-dimethyl anilide.

3. Method of manufacturing nipecotic acid 2-ethyl anilide which comprises reacting 2-ethyl analine-N-magnesium bromide with nipecotic acid ethyl ester, then hydrolyzing the thus-produced reaction product to obtain nipecotic acid 2-ethyl anilide.

4. Method of manufacturing isonicotinic acid anilide which comprises reacting aniline-N-magnesium bromide with isonicotinic acid ethyl ester, then hydrolyzing the thus-produced reaction product to obtain the isonicotinic acid anilide.

5. Method of manufacturing N-n-butyl pyrrolidine-2 carboxylic acid 2-chloro-6-methyl anilide which comprises reacting 2-chloro-6-methyl aniline-N-magnesium bromide with N-n-butyl pyrrolidine 2-carboxylic acid ester, then hydrolyzing the thus-produced reaction product to obtain the N-n-butyl pyrrolidine-2 carboxylic acid 2-chloro-6-methyl anilide.

6. A method of manufacturing a heterocyclic carboxylic acid anilide which comprises reacting an aniline-N-magnesium halogenide with an ester of a member of the group of N-alkyl piperidine and pyrrolidine carboxylic acids, piperidine-, pyrrolidine- and pyridine carboxylic acids, and then hydrolyzing the thus-produced reaction product to obtain the desired heterocyclic carboxylic acid anilide.

No references cited.